United States Patent
Shields et al.

(10) Patent No.: US 8,595,010 B2
(45) Date of Patent: Nov. 26, 2013

(54) PROGRAM FOR CREATING HIDDEN MARKOV MODEL, INFORMATION STORAGE MEDIUM, SYSTEM FOR CREATING HIDDEN MARKOV MODEL, SPEECH RECOGNITION SYSTEM, AND METHOD OF SPEECH RECOGNITION

(75) Inventors: Paul W. Shields, Glasgow (GB); Matthew E. Dunnachie, West Calder (GB); Yasutoshi Takizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 923 days.

(21) Appl. No.: 12/701,008

(22) Filed: Feb. 5, 2010

(65) Prior Publication Data

US 2010/0217593 A1 Aug. 26, 2010

Related U.S. Application Data

(60) Provisional application No. 61/150,114, filed on Feb. 5, 2009.

(51) Int. Cl.
 *G10L 15/00* (2013.01)
(52) U.S. Cl.
 USPC ............................ 704/255; 704/240; 704/251
(58) Field of Classification Search
 USPC .......................................... 704/240, 251, 255
 See application file for complete search history.

(56) References Cited

U.S. PATENT DOCUMENTS

| | | | | |
|---|---|---|---|---|
| 6,243,677 | B1* | 6/2001 | Arslan et al. | 704/244 |
| 6,470,315 | B1* | 10/2002 | Netsch et al. | 704/256.5 |
| 2003/0200090 | A1* | 10/2003 | Kawazoe | 704/251 |
| 2003/0220792 | A1 | 11/2003 | Kobayashi et al. | |
| 2005/0203737 | A1* | 9/2005 | Miyazaki | 704/240 |
| 2005/0256712 | A1* | 11/2005 | Yamada et al. | 704/255 |
| 2007/0219793 | A1* | 9/2007 | Acero et al. | 704/240 |
| 2008/0167872 | A1* | 7/2008 | Okimoto et al. | 704/251 |

FOREIGN PATENT DOCUMENTS

| | | |
|---|---|---|
| JP | 02-268757 | 11/1990 |
| JP | 2003-345384 A | 12/2003 |

* cited by examiner

*Primary Examiner* — Daniel D Abebe (57) ABSTRACT

A program for generating Hidden Markov Models to be used for speech recognition with a given speech recognition system, the information storage medium storing a program, that renders a computer to function as a scheduled-to-be-used model group storage section that stores a scheduled-to-be-used model group including a plurality of Hidden Markov Models scheduled to be used by the given speech recognition system, and a filler model generation section that generates Hidden Markov Models to be used as filler models by the given speech recognition system based on all or at least a part of the Hidden Markov Model group in the scheduled-to-be-used model group.

22 Claims, 5 Drawing Sheets

PROGRAM FOR CREATING HIDDEN MARKOV MODEL, INFORMATION STORAGE MEDIUM, SYSTEM FOR CREATING HIDDEN MARKOV MODEL, SPEECH RECOGNITION SYSTEM, AND METHOD OF SPEECH RECOGNITION

Contents of U.S. application 61/150,114 filed Feb. 5, 2009 are included in the present application.

BACKGROUND OF THE INVENTION

Speech recognition systems, such as, ASR system (ASR: Automatic Speech Recognition) and the like provide electronic apparatuses with easy-to-use user interfaces. One of the problems a speech recognition system faces is a problem concerning how to distinguish target words that should be recognized (In Vocabulary (IV)) from sounds that are to be excluded as recognition targets (Out Of Vocabulary (OOV)), such as, "er . . . ," "well . . . ," coughing and the like.

As a prior art document in this field, U.S. Pat. No. 2,886,177 can be enumerated. The speech recognition system can use Hidden Markov Models for modeling sounds in a sequence of speech sounds. Each elemental speech sound is known as a phoneme, and can be modeled by an individual Hidden Markov Model. Recognition target words and sentences are defined as combinations of phonemes in a grammar file. The grammar file is a file that defines as to which one of phoneme (Hidden Markov Model) sequences composes each of recognition target words-sentences. Input speech sound can be recognized according to the probability of matching a feature vector sequence extracted from the input speech sound with a Hidden Markov Model sequence defined in the grammar file.

However, signals that do not exist in a grammar file or a dictionary (OOV sounds) may be inputted in the speech recognition system. These OOV sounds are judged to be OOV or IV through calculation of the probability of matching them with OOV sound models and the probability of matching them with IV word models.

Normally, Hidden Markov Models used for modeling those OOV sounds are called filler models. There is still a room for performance improvement in the performance of the most advanced filler models. In particular, it is difficult to minimize both "false positive (to recognize OOV as IV)" and "false negative (to recognize IV as OOV)," in other words, to realize a speech recognition apparatus that does not recognize words and sounds undesired to be recognized, and recognizes words that should be recognized, and attempts are being made to improve the performance thereof in this respect.

SUMMARY

An information storage medium in accordance with a first embodiment of the invention pertains to a computer-readable information storage medium that stores a program for generating Hidden Markov Models to be used for speech recognition with a given speech recognition system, and the information storage medium stores a program that renders a computer to function as a scheduled-to-be-used model group storage section that stores a scheduled-to-be-used model group including a plurality of Hidden Markov Models scheduled to be used by the given speech recognition system and a filler model generation section that generates Hidden Markov Models to be used as filler models by the given speech recognition system based on all or at least a part of the Hidden Markov Model group in the scheduled-to-be-used model group.

Further, a Hidden Markov Model generation system in accordance with a second embodiment of the invention pertains to a Hidden Markov Model generation system that generates Hidden Markov Models to be used for speech recognition with a given speech recognition system, and the Hidden Markov Model generation system includes a scheduled-to-be-used model group storage section that stores a scheduled-to-be-used model group including a plurality of Hidden Markov Models scheduled to be used by the given speech recognition system and a filler model generation section that generates Hidden Markov Models to be used as filler models by the given speech recognition system based on all or at least a part of the Hidden Markov Model group in the scheduled-to-be-used model group.

Moreover, a method for performing speech recognition using a computer in accordance with a third embodiment of the invention pertains to a speech recognition method including a step of reading, from a storage section, all or a part of a group of plurality of Hidden Markov Models scheduled to be used by a given speech recognition system, and generating Hidden Markov Models to be used as filler models by the given speech recognition system based on all or at least a part of the group of Hidden Markov Models in the scheduled-to-be-used model group and storing them in a storage section; a step of inputting speech sound data and generating feature vectors; and a speech recognition step of performing speech recognition of the speech sound data based on the feature vectors, and the group of plurality of Hidden Markov Models scheduled to be used and the Hidden Markov Models to be used as the filler models which are stored in the storage section.

DETAILED DESCRIPTION OF THE EMBODIMENT

Preferred embodiments of the invention are described in detail below with reference to the drawings. It is noted that the embodiments described below do not limit the content of the invention recited in the scope of the patent claims. Furthermore, all of the compositions to be described below may not necessarily be indispensable compositions of the invention.

1. Hidden Markov Models Generation System

Figure 1:
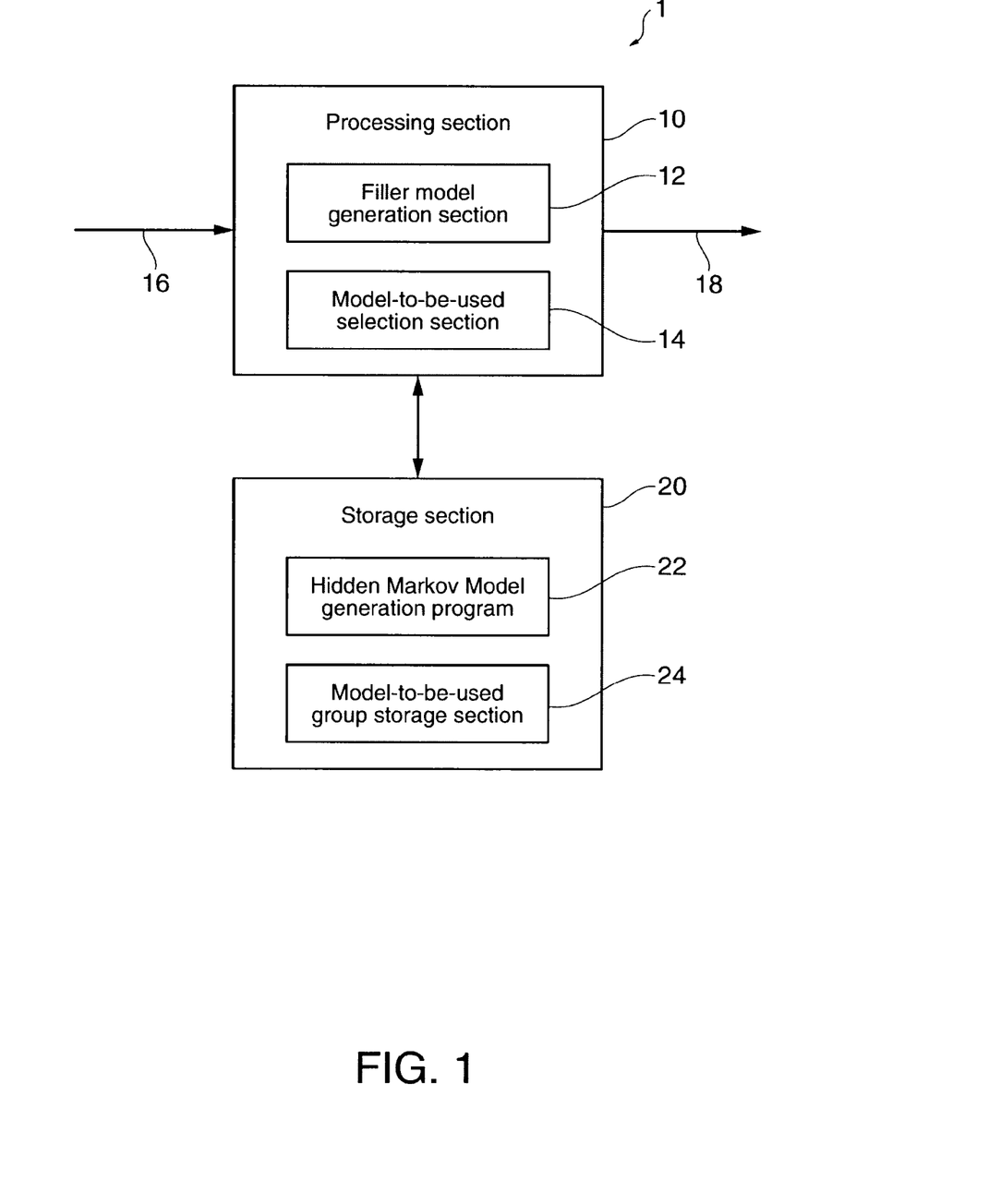
FIG. 1 is an example of a functional block diagram of a Hidden Markov Model generation system in accordance with the present embodiment.

FIG. 1 is an example of a functional block diagram of a Hidden Markov Model generation system in accordance with an embodiment of the invention.

The Hidden Markov Model generation system 1 of the present embodiment does not need to include all of the compositions (parts) shown in FIG. 1, and can have a structure with a portion thereof being omitted. It is noted that the Hidden Markov Model generation system 1 of the present embodiment is a system that generates Hidden Markov Models to be used for speech recognition by a given speech recognition system, and may be realized using, for example, a general-purpose computer.

The Hidden Markov Model generation system 1 of the present embodiment includes a storage section 20. The storage section 20 stores programs and data, and its function can be realized by hardware, such as, a computer readable medium (an optical disk (CD, DVD or the like), a magneto optical disk (MO), a magnetic disk, a hard disk, a magnetic tape, or a memory (ROM)) or the like. Also, the storage section 20 may include hardware such as a RAM having a function as a temporary storage section that serves as a work area for a processing section 10.

The storage section 20 stores a Hidden Markov Model generation program 22 in accordance with an embodiment of the invention. The Hidden Markov Model generation program is a program that renders a computer (the processing section 10, the storage section 20) to function as each of sections (a filler model generation section 12, a use model selection section 14, a scheduled-to-be-used model group storage section 24) to be described below.

Also, the storage section 20 functions as a scheduled-to-be-used model group storage section 24.

The Hidden Markov Model generation system 1 of the present embodiment includes the processing section 10. The processing section 10 performs a variety of processings based on input data 16 and programs, and its function can be realized by hardware such as one of various kinds of processors (CPU, DSP, and the like.), ASIC (gate arrays and the like), or programs. The processing section 10 functions as the filler model generation section 12 and the use model selection section 14.

The Hidden Markov Model generation system 1 of the present embodiment includes a scheduled-to-be-used model group storage section 24 that stores a scheduled-to-be-used model group including a plurality of Hidden Markov Models scheduled to be used by a given speech recognition system that generates Hidden Markov Models to be used for speech recognition by the given speech recognition system, and a filler model generation section 12 that generates Hidden Markov Models to be used as filler models by the given speech recognition system based on all or at least a part of the Hidden Markov Model groups in the scheduled-to-be-used model group.

Here, the filler models conceptually include OOV models and so-called garbage models. Hidden Markov Models to be used as the filler models may be generated by using all of the scheduled-to-be-used Hidden Markov Models, or may be generated by using a part of the plurality of Hidden Markov Models. For example, Hidden Markov Models to be used as filler models for vowels may be generated using only Hidden Markov Models of vowel phonemes.

By so doing, the amount of computation and the amount of memory to be used necessary for generating Hidden Markov Models to be used as filler models can be reduced, compared to the conventional method (for example, Trained HMM)

The scheduled-to-be-used model group may be a set of Hidden Markov Models corresponding to a plurality of elements for recognizing pronunciation of a language to be recognized by a given speech recognition system. The elements are those called phonemes or phonemic or phonetic segments for modeling speech sounds according to each language, and may include silence models. For example, when the target language to be recognized by a given speech recognition system is the English language, the scheduled-to-be-used model group may be composed of 44 phoneme models and one silence model.

The filler models are Hidden Markov Models that are used to recognize sounds that are not registered in the system in advance or unregistered words (words out of vocabulary (OOV) to be recognized by the system).

The filler model generation section 12 may classify a plurality of probability density functions composing the entirety or at least a part of the Hidden Markov Model group in the scheduled-to-be-used model group into a plurality of clusters, obtain parameters of probability density functions of each of the clusters based on a given parameter that defines one or a plurality of probability density functions classified as each of the clusters, and obtain given parameters for defining probability density functions that compose Hidden Markov Models to be used as the filler models based on the parameters of probability density functions of each of the obtained clusters. The given parameters for defining the probability density functions may be, for example, means that are the parameters of normal distributions.

The Hidden Markov Model belonging to the scheduled-to-be-used model group may be composed of a plurality of states, and each of the states may have a plurality of probability density functions. The filler model generation section 12 may be structured to generate, as the Hidden Markov Model to be used as the filler model, Hidden Markov Model composed of the same number of states as that of the Hidden Markov Model belonging to the scheduled-to-be-used model group, and may classify a plurality of probability density functions composing each of the states of the entirety or at least a part of the Hidden Markov Model group in the scheduled-to-be-used model group into a plurality of clusters, and obtain given parameters for defining the probability density functions composing each of the states of the Hidden Markov Models to be used as the filler models.

Also, the filler model generation section 12 may classify the plurality of probability density functions composing the Hidden Markov Model to be used as the filler model or its state into the same number of clusters as that of the probability density functions composing the Hidden Markov Model composing the scheduled-to-be-used model group or its state.

By so doing, it is possible to generate Hidden Markov Models to be used as the filler models in the same structure (for example, the structure with the same number of normal distributions composing each of the states) as that of Hidden Markov Models (Hidden Markov Models composing the scheduled-to-be-used model group) the system already has. Accordingly, when using the generated Hidden Markov Models by a given speech recognition system, modifications of the system can be made unnecessary or suppressed to a minimum.

The filler model generation section 12, when obtaining the cluster value of each of the clusters, may perform a process of updating the parameter of the probability density functions of the cluster by re-classifying the plurality of probability density functions into the plurality of clusters, repeatedly until a specified repetition number is reached, or until a change in the parameter of the probability density functions of the cluster at the time of update becomes lower than a specified threshold value.

Also the filler model generation section 12 may obtain, based on the mean for defining one or a plurality of probability density functions classified into each cluster, the mean for defining probability density functions composing Hidden Markov Models to be used as the filler models or their state, and obtain, based on the variance for defining one or a plurality of probability density functions classified as each cluster, the variance for defining probability density functions composing of Hidden Markov Models to be used as the filler models or their state.

For example, when obtaining the variance for the filler models based on M number of probability density functions, the variance for the filler models may be obtained through a simple average of M number of variances. Also, as each of the probability density functions has a weighting coefficient, the calculation may be done with them included.

Also, the filler model generation section 12 may obtain a state-to-state transition matrix of Hidden Markov Models to be used as the filler models based on a transition matrix defining state-to-state transition probabilities of the entirety or at least a part of the Hidden Markov Model group in the scheduled-to-be-used model group.

The state-to-state transition matrix of Hidden Markov Models defines a probability of transiting from a given state to the next state and a probability of transiting to the same state, but may define only one of them.

The Hidden Markov Model generating system 1 of the present embodiment includes a model-to-be-used selection section 14 that selects, as models to be used, Hidden Markov Models to be used for generating filler models from the scheduled-to-be-used model group, and the filler model generation section 12 may generate Hidden Markov Models to be used as the filler models by the given speech recognition system based on the Hidden Markov Model group selected as the models to be used.

Also, the model-to-be-used selection section 24 may detect elements necessary for speech-recognizing a designated vocabulary or a sentence, and may select Hidden Markov Models of elements other than the detected elements as models to be used.

Phonemes composing a designated vocabulary or a sentence may be detected as elements necessary for speech-recognizing the designated vocabulary or the sentence, and Hidden Markov Models of phonemes other than the detected phonemes may be selected as a group of models to be used.

By designating vocabulary or sentences relating to speech recognition, objects for speech recognition can be narrowed down. Further by generating filler models based on Hidden Markov Models of phonemes other than phonemes composing the objects for speech recognition narrowed down, filler models with high OOV recognition accuracy can be generated.

Also, the model-to-be-used selection section 14 may detect elements necessary for speech-recognizing input text data, and may select, as models to be used, Hidden Markov Models of elements other than the detected elements.

Phonemes composing input text data may be detected as elements necessary for speech-recognizing the input text data, and Hidden Markov Models of phonemes other than the detected phonemes may be selected as models to be used.

When input text data are target words for speech recognition, phonemes necessary for recognizing the target words for speech recognition can be specified. By generating filler models based on Hidden Markov Models of phonemes other than the phonemes composing the specified words for speech recognition, filler models with high OOV recognition accuracy can be generated.

2. Hidden Markov Model Generation Method

Next, a Hidden Markov Model generation method in accordance with the present embodiment will be described. Here, a method for generating one or more filler models by using the K-means method (K-means algorithm) is used as an example to describe a Hidden Markov Model generation method (a method realized by a program and a system).

Markov Models are statistic state machines, and are probability models by which state transitions are modeled by probabilities. Hidden Markov Models are Markov Models where the current state is not observable. Instead of the current state information, a Hidden Markov Model emits one symbol per state. The probability of a specified state emitting a specified symbol is modeled by a parameter (for example, the mean and the variance) of normal distributions (an example of probability density functions).

In the speech recognition system, the sequence of input speech sounds can be modeled by the sequence of feature vectors extracted from the input speech sounds. By calculating probabilities of the sequence of feature vectors contained in Hidden Markov Model sequences defining speech sounds to be recognized, speech sounds corresponding to those of the Hidden Markov Model sequences contained with the highest probability are recognized as the speech sounds that are spoken.

Filler models are Hidden Markov Models for recognizing words that are not registered in the speech recognition system in advance or unregistered words (words out of vocabulary (OOV) to be recognized by the system), and include models that are called garbage models and OOV sound models.

Figure 2:
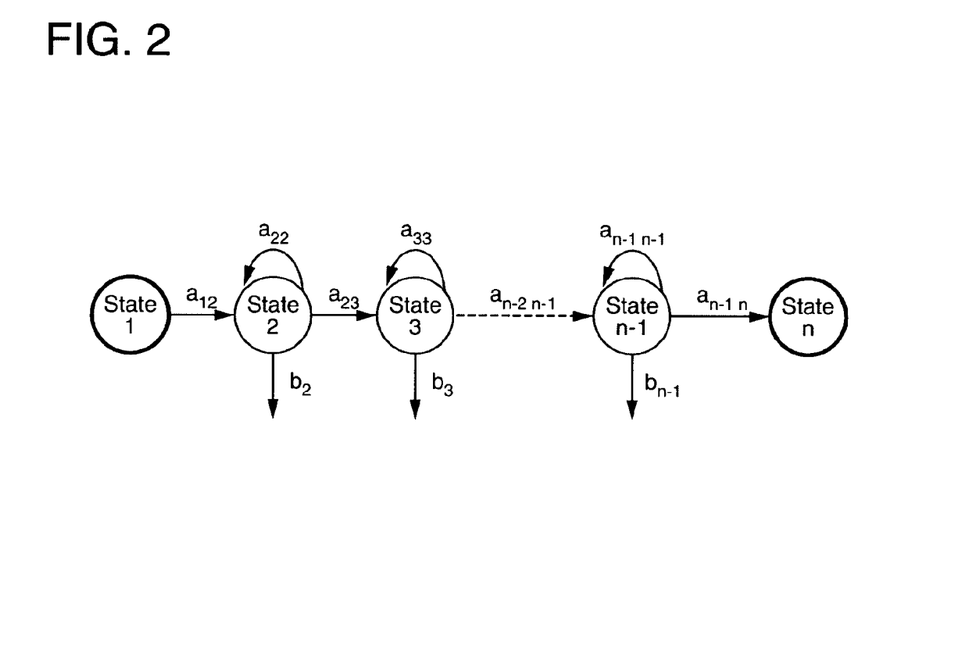
FIG. 2 is a figure explaining a structure of Hidden Markov Models.

FIG. 2 shows a state diagram of a Hidden Markov Model of left-right (transition is possible only in one direction from left to right) n-states. In this diagram, state 1 and state n are only capable of state transition and do not emit symbols. The other states (state 2 to state$_{n-1}$) emit symbols. The probability of remaining at each state (transiting to itself) $a_{22}$, $a_{33}$, ... $a_{n-1\ n-1}$, and the probability of transiting to the next (right) state $a_{23}$, $a_{34}$, ... $a_{n-1\ n}$ are defined. Here, the sum of the probability of remaining at each state (transiting to itself) $a_{22}$, $a_{33}$, ... $a_{n-1\ n-1}$ and the probability of transiting to the next (right) state $a_{23}$, $a_{34}$, ... $a_{n-1\ n}$ at each of the states is 1.

Figure 3:
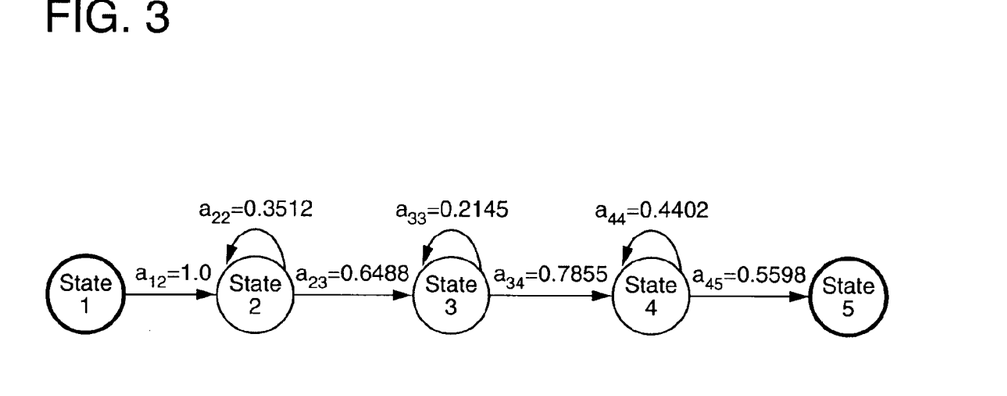
FIG. 3 is a figure explaining a structure of Hidden Markov Models.

FIG. 3 shows a Hidden Markov Model of a phoneme "@" that is a component of Apple.

Hidden Markov Models corresponding to phonemes have phonemic segments that differ from one language to another. For example, the English language is composed of 44 phoneme models and one silence model for modeling speech sounds. Each of the phonemes has S number of states (states). Each of the states has M number of probability density functions, parameters of the probability density functions (for example, normal distributions, means, variances) and state transition probabilities. Each of the probability density functions is in N-th dimension (for example, in the case of normal distributions, each has N number of means and variances). In speech recognition, A/D conversion, fast Fourier transform (FFT), Cepstrum calculation and the like are rendered on input speech sound to extract N number of feature vectors, and the dimension is decided corresponding to the N.

The Hidden Markov Model belonging to the scheduled-to-be-used model group of the present embodiment is composed of a plurality (for example S number) of states, each of the states has a plurality of normal distributions (an example of probability density functions) (for example, M number of normal distributions), and each of the normal distributions has means and variances in the number of the feature vectors (for example, N number).

In the present embodiment, the number of states included in Hidden Markov Model of the scheduled-to-be-used model group may be any number. Similarly, the number of normal distributions included in the Hidden Markov Model or each of its states may be any number.

Hidden Markov Models to be used as filler models can be generated using the Baum-Welch algorithm. The Baum-Welch algorithm is an expectation—maximization algorithm. Process to estimate model parameters, process to evaluate performance of the models and process to update the model parameters according to the result of evaluation are repeated until a specified number of iterations is reached or until changes in the model parameters at the time of update become lower than a specified threshold value.

The K-means algorithm (also called the K-means method) is a clustering algorithm that classifies data into groups (or clusters). In the present embodiment, the means of normal distributions contained in the Hidden Markov Model in the scheduled-to-be-used model group are classified into groups by the K-means algorithm. Each of the groups is called a cluster.

In the present embodiment, the means of normal distributions contained in the Hidden Markov Model in the scheduled-to-be-used model group are classified into groups by the K-means algorithm. Until changes in the parameters of probability density functions (for example, the means of normal distributions) of each of the groups (synonymous to clusters) at the time of updating the parameter become lower than a specified threshold value, the process of updating the parameters of the probability density functions is repeated.

Figure 4:
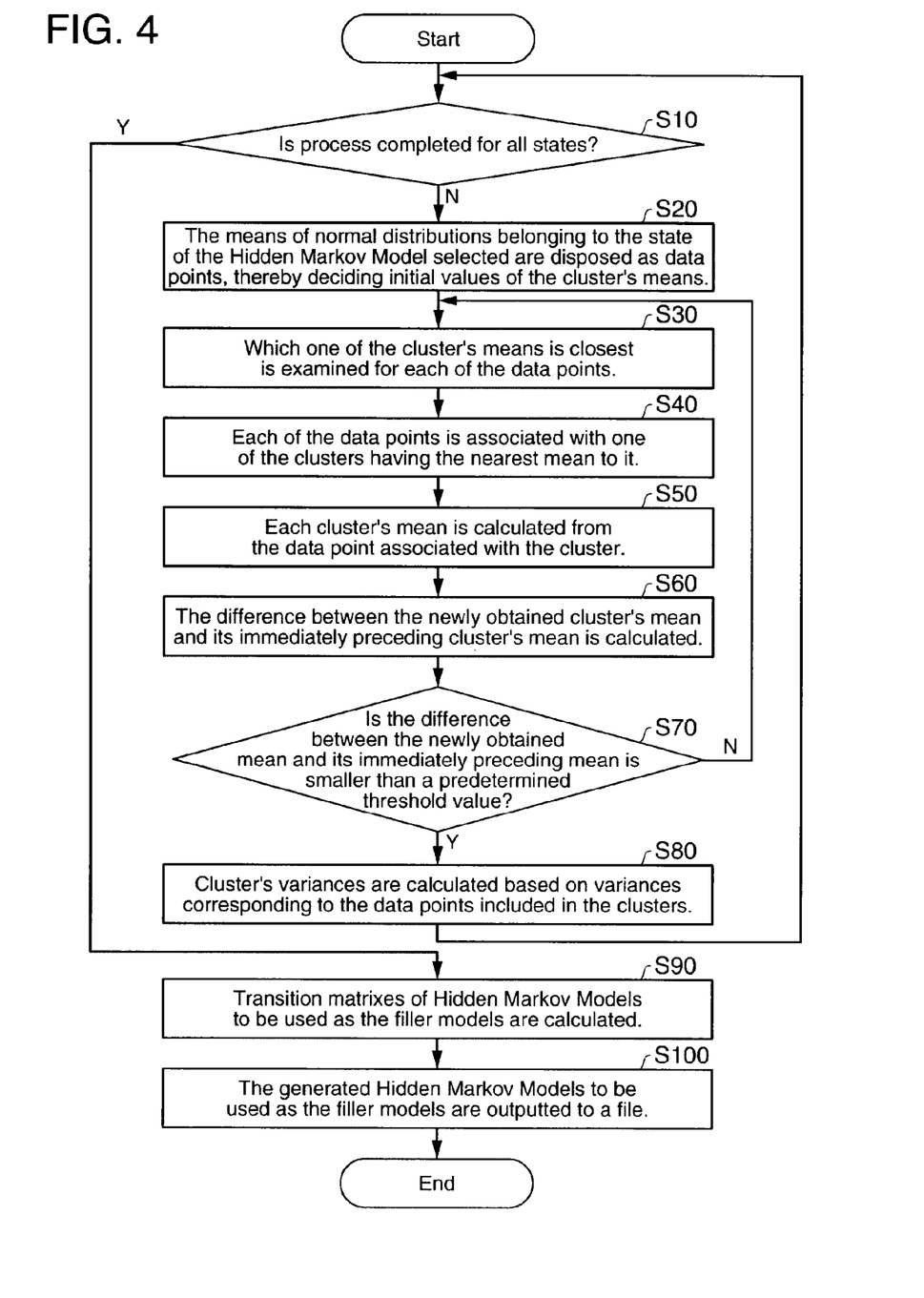
FIG. 4 is a flow chart showing a flow of a Hidden Markov Model generation process in accordance with the present embodiment.

FIG. 4 is a flow chart showing the flow of the Hidden Markov Model generation process in accordance with the present embodiment. An example of the algorithm for generating Hidden Markov Models to be used as filler models is shown, but the algorithm is not limited to the contents described herein.

The number of necessary clusters and data points need to be initially decided. It is possible to select the number of clusters to be the same as the number of normal distributions contained in the state of the Hidden Markov Model composing each phoneme. As the data points, the means of normal distributions (which is an example of the parameters of probability density functions) contained in the Hidden Markov Model composing each phoneme may be used.

For example, an English speech recognition apparatus uses 44 phoneme models and one silence phoneme model for modeling speech sounds. The number of phonemes can be changed if necessary. Hidden Markov Models to be used as filler models may be generated from 44 phonemes. It is noted that, for generating Hidden Markov Models to be used as filler models, the entire 44 phonemes may be used, or a part of the phonemes may be used. For example, filler models for vowels may be generated by using only vowel phonemes. When each of the phonemes has S number of states (states), the K-means algorithm is processed for each of the states, and thus the process including steps S10-S80 is repeated S times. Each of the states is composed of M number of normal distributions, and the normal distributions are defined by N number of means and N number of variances. Normally, N is 39, which corresponds to the number of feature vectors of speech sounds generated at the time of speech recognition. 44×M number of data points are used for processing the K-Means algorithm, which is repeated S times.

Using N number of means, the distance from a data point to a cluster's mean is calculated. The flow chart of the K-means algorithm will be described below.

Until the processing of all the states is completed, the process from Step S10 to Step S80 is repeated. In other words, the K-means algorithm is repeated S times (the number of the states). Upon completing the process for the entire states, Step S90 is performed.

First, the means of normal distributions belonging to the state of the Hidden Markov Model selected by the model to-be-used selection section are disposed as data points, thereby deciding initial values of the cluster's means (Step S20). Hidden Markov Models may include a silence model, in addition to the Hidden Markov Models composing phonemes for recognizing registered words. There are several methods for deciding initial values of the cluster's means, and any one of the methods may be appropriately used. As one of the methods to determine initial values, initial values of the cluster's means may be randomly decided. Also, initial values of the cluster's means may be decided in a manner to be uniformly arranged in a space in which data points are arranged. Also, the number of data points may be reduced by using Principal Component Analysis (PCA), and the cluster's means may be selected from them in a manner to be uniformly distributed.

Which one of the cluster's means is closest is examined for each of the data points (Step S30). The distance between a data point and a cluster's mean may be obtained by using the Euclidean distance that is a special form of the Minkowski distance as indicated in Equation 1. In the case of the Euclidean distance, P=2 in Equation 1. Also, in the embodiment, d=39.

$$d_p(X, Y) = \left(\sum_{k=1}^{d} |X_k - Y_k|^p\right)^{1/p} \quad \text{Equation 1}$$

Minkowski Metric

Next, each of the data points is associated with one of the clusters having the nearest mean to it. (Step S40).

Each cluster's mean is calculated from the data point associated with the cluster using Equation 3. Here, C is the number of data points included in the cluster, and K is the number of parameters of each normal distribution (39 in the present exemplary embodiment). (Step 50).

$$\overline{Mean_K} = \frac{1}{C}\sum_{i=1}^{C} Mean_{i,K} \text{ for } K = 1 \text{ to } 39 \quad \text{Equation 3}$$

Calculation of Mean Variance Values

Next, for each of the clusters, the difference between the newly obtained cluster's mean and its immediately preceding cluster's mean is calculated. The Euclidean distance is used for calculation of the difference. (Step S60).

Whether or not the difference between the newly obtained mean and its immediately preceding mean is smaller than a predetermined threshold value is judged for all of the clusters (step S70), and when it is not smaller than the threshold value, the process is repeated from Step S30.

When the difference between the newly obtained mean and its immediately preceding mean is smaller than a predetermined threshold value for all of the clusters, cluster's variances are calculated based on variances corresponding to the data points included in the clusters (Step S80). The data points included in (associated with) the cluster retain 39 variances corresponding thereto. The mean of these 39 variances is used as the variance of the cluster. Equation 2 shows a method of calculating the cluster's variance. Here, C indicates the number of data points included in the cluster, and K indicates the number of parameters of each normal distribution (39 in the present exemplary embodiment).

$$\overline{Var_K} = \frac{1}{C}\sum_{i=1}^{C} Var_{i,K} \text{ for } K = 1 \text{ to } 39 \quad \text{Equation 2}$$

Calculation of Mean Variance Values

Each normal distribution has a weighting coefficient, which is thus included when the calculation is performed. One of the weighting methods is to set all of the weightings to be equal to one another. For example, when each of the states includes M number of normal distributions, the weighting coefficient is 1/M.

Next, transition matrixes of Hidden Markov Models to be used as the filler models are calculated (Step S90). Each of Hidden Markov Models has, as described in FIGS. 2 and 3, a transition matrix defining probabilities of transiting from one state to the next state and the probabilities of transiting to the same state. The mean of transition probabilities of the Hidden Markov Model of each phoneme may be used as the transition matrix of Hidden Markov Models to be used as the filler models.

The generated Hidden Markov Models to be used as the filler models are outputted to a file. (Step S100).

The Hidden Markov Models to be used as filler models generated by the K-means method, according to the embodiment described above, provide better performance than filler models generated by the Trained HMM method using the conventional Baum-Welch algorithm.

This is proved by low "false positive" and "false negative" according to the results of recognition using filler models generated by the K-means. The speech recognition system using the present embodiment can realize higher OOV rejection performance, and as a result, can provide a more natural speech sound interface. Also, it is advantageous in that the amount of computation and the amount of memory to be used necessary for generating Hidden Markov Models to be used as filler models are substantially smaller, compared to those of the Trained HMM method.

3. Speech Recognition System

Figure 5:
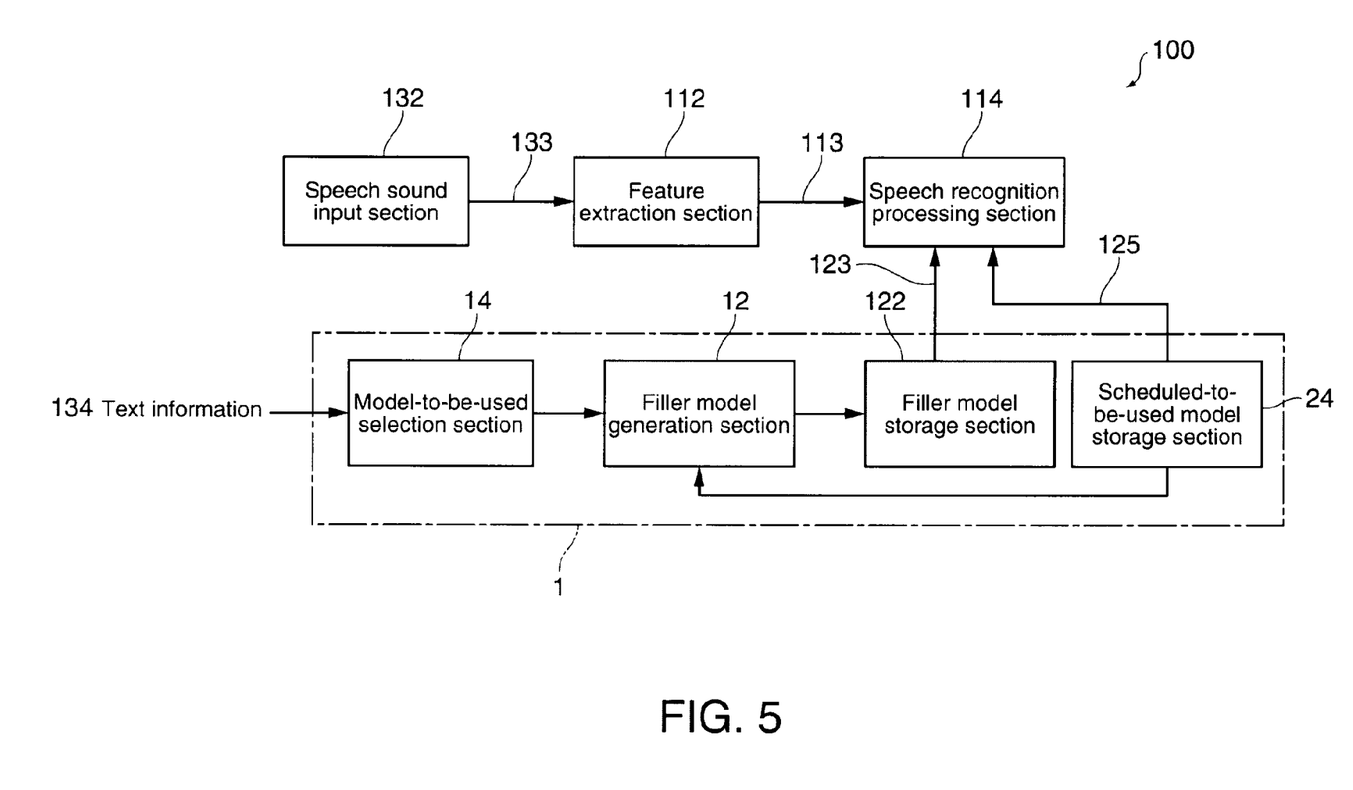
FIG. 5 is an example of a functional block diagram of a speech recognition device in accordance with the present embodiment.

FIG. 5 shows an example of a functional block diagram of a speech recognition system in accordance with an embodiment. The speech recognition system 100 in accordance with the present embodiment does not necessarily include all of the components (sections) shown in FIG. 5, and may have a structure with a part thereof omitted. Components (sections) same as those shown in FIG. 1 are appended with the same reference numbers, and as their function is the same as the function described with reference to FIG. 1, their description is omitted. The speech recognition system 100 in accordance with the present embodiment may be realized by using, for example, a general purpose computer, or dedicated hardware.

The speech input apparatus 100 in accordance with the present embodiment includes a Hidden Markov Model generation system 1 described in FIG. 1, a filler model storage section 122 that stores Hidden Markov Models to be used as filler models generated by the Hidden Markov Model generation system 1, a feature extraction section 112 that receives inputs of speech sound data 133 and generates feature vectors 113, and a speech recognition processing section 114 that performs speech recognition of the speech sound data 133 based on the feature vectors 113, Hidden Markov Models 123 composing the scheduled-to-be-used model group and Hidden Markov Models 125 to be used as the filler models.

Also, the speech input apparatus 100 in accordance with the present embodiment may include a speech sound input section 132 (for example, a microphone or the like) for inputting speech sounds of a speaker.

The feature extraction section 112 performs A/D conversion, fast Fourier transform (FFT), Cepstrum calculation and the like on input speech sounds to extract feature vectors.

Speech recognition using Hidden Markov Models generated in this manner as filler models can realize higher OOV rejection performance and, as a result, can provide more natural speech sound interfaces.

Figure 6:
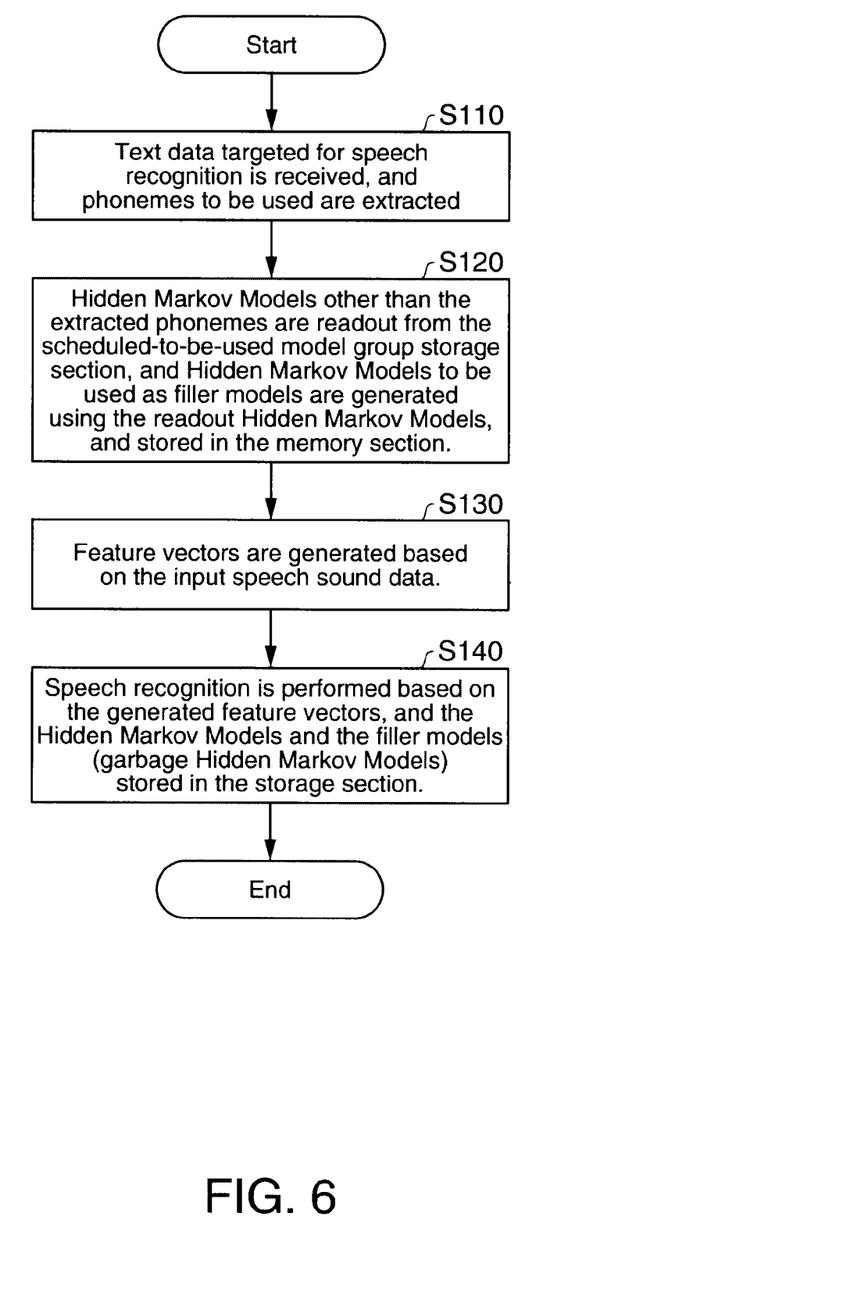
FIG. 6 is a flow chart showing a flow of speech recognition process in accordance with the present embodiment.

FIG. 6 is a flow chart showing the process flow of speech recognition processing in accordance with the present embodiment. Text data targeted for speech recognition is received, and phonemes to be used are extracted (Step S110). Next, Hidden Markov Models other than the extracted phonemes are readout from the scheduled-to-be-used model group storage section, and Hidden Markov Models to be used as filler models are generated using the readout Hidden Markov Models, and stored in the memory section (Step S120). Next, feature vectors are generated based on the input speech sound data (Step S130). Next, speech recognition is performed based on the generated feature vectors, and the Hidden Markov Models and the filler models (garbage Hidden Markov Models) stored in the storage section (Step S140).

In this manner, Hidden Markov Models to be used as filler models can be generated in real time based on target text data for speech recognition, and speech recognition using the generated Hidden Markov Models can be performed. Therefore, it is possible to provide a speech recognition system that can perform speech recognition through generating optimum filler models according to recognition targets.

The invention is not limited to the present embodiments, and many modifications can be made within the scope of the subject matter of the invention. The invention may include compositions that are substantially the same as the compositions described in the embodiments (for example, a composition with the same function, method and result, or a composition with the same objects and result). Also, the invention includes compositions in which portions not essential in the compositions described in the embodiments are replaced with others. Also, the invention includes compositions that achieve the same functions and effects or achieve the same objects of those of the compositions described in the embodiments. Furthermore, the invention includes compositions that include publicly known technology added to the compositions described in the embodiments.

What is claimed is:

1. A computer-readable information storage medium that stores a program for generating Hidden Markov Models to be used for speech recognition with a given speech recognition system, the information storage medium storing a program that renders a computer to function as:
   a scheduled-to-be-used model group storage section that stores a scheduled-to-be-used model group including a plurality of Hidden Markov Models scheduled to be used by the given speech recognition system; and
   a filler model generation section that generates Hidden Markov Models to be used as filler models by the given speech recognition system based on all or at least a part of the Hidden Markov Model group in the scheduled-to-be-used model group;
   wherein the filler model generation section classifies a plurality of probability density functions composing all or at least a part of the Hidden Markov Model group in the scheduled-to-be-used model group into a plurality of clusters, obtains a given parameter for defining probability density functions composing Hidden Markov Models to be used as filler models, based on the obtained probability density functions of each of the clusters.

2. The information storage medium according to claim 1, wherein
the scheduled-to-be-used model group is a set of Hidden Markov Models corresponding to a plurality of elements for recognizing speech sounds of a language to be recognized by the given speech recognition system.

3. The information storage medium according to claim 1, wherein
the Hidden Markov Model belonging to the scheduled-to-be-used model group is composed of a plurality of states, each of the states having a plurality of probability density functions,
the filler model generation section is composed to generate, as the Hidden Markov Model to be used as filler model, Hidden Markov Model composed of the same number of states as that of the Hidden Markov Model belonging to the scheduled-to-be-used model group,
classify a plurality of probability density functions composing each of the states of all or at least a part of the Hidden Markov Model group in the scheduled-to-be-used model group into a plurality of clusters, and
obtain given parameters for defining the probability density functions composing each of the states of the Hidden Markov Model to be used as the filler model.

4. The information storage medium according to claim 1, wherein the filler model generation section classifies a plurality of probability density functions composing the Hidden Markov Model to be used as the filler model or its state into the same number of clusters as that of the probability density functions composing the Hidden Markov Model composing the scheduled-to-be-used model group or its state.

5. The information storage medium according to claim 1, wherein, when obtaining cluster values of each of the clusters, the filler model generation section performs a process to re-classify the plurality of probability density functions into the plurality of clusters to update the cluster values, a process to update parameters of probability density functions of each of the clusters, until a specified number of iterations is reached, or until changes in the parameters of probability density functions of the cluster at the time of update become lower than a specified threshold value.

6. The information storage medium according to claim 1, wherein the filler model generation section
obtains a mean for defining probability density functions composing the Hidden Markov Model to be used as the filler model or its state based on a mean for defining one or a plurality of probability density functions classified into each of the clusters, and
obtains a variance for defining probability density functions composing the Hidden Markov Model to be used as the filler model or its state based on a variance for defining one or a plurality of probability density functions classified into each of the clusters.

7. The information storage medium according to claim 3, wherein the filler model generation section obtains a transition matrix that defines transition probabilities among states of the Hidden Markov Model to be used as the filler model based on a transition matrix among states of all or at least a part of the Hidden Markov Model group in the scheduled-to-be-used model group.

8. The information storage medium according to claim 1, wherein the computer is rendered to function as a model-to-be-used selection section that selects, from the scheduled-to-be-used model group, Hidden Markov Models to be used for generating filler models, as models to be used, and the filler model generation section generates Hidden Markov Models to be used as filler models by the given speech recognition system based on the Hidden Markov Model group selected as the models to be used.

9. The information storage medium according to claim 8, wherein the model-to-be-used selection section detects elements necessary for speech recognition of designated vocabulary or sentence, and selects Hidden Markov Models of elements other than the detected elements as the models to be used.

10. The information storage medium according to claim 8, wherein the model-to-be-used selection section detects elements necessary for speech recognition of input text data, and selects Hidden Markov Models of elements other than the detected elements as the models to be used.

11. A Hidden Markov Model generation system that generates Hidden Markov Models to be used for speech recognition with a given speech recognition system, the Hidden Markov Model generation system comprising:
a scheduled-to-be used model group storage section that stores a scheduled-to-be-used model group including a plurality of Hidden Markov Models scheduled to be used by the given speech recognition system; and
a filler model generation section that generates Hidden Markov Models to be used as filler models by the given speech recognition system based on all or at least a part of the Hidden Markov Model group in the scheduled-to-be-used model group;
wherein the filler model generation section classifies a plurality of probability density functions composing all or at least a part of the Hidden Markov Model group in the scheduled-to-be-used model group into a plurality of clusters, obtains a given parameter for defining probability density functions composing Hidden Markov Models to be used as filler models.

12. The Hidden Markov Model generation system according to claim 11, wherein the scheduled-to-be-used model group is a set of Hidden Markov Models corresponding to a plurality of elements for recognizing speech sounds of a language targeted for recognition by a given speech recognition system.

13. The Hidden Markov Model generation system according to claim 11, wherein the Hidden Markov Model belonging to the scheduled-to-be-used model group is composed of a plurality of states, each of the states having a plurality of probability density functions,
the filler model generation section is composed to generate, as the Hidden Markov Model to be used as filler model, Hidden Markov Model composed of the same number of states as that of the Hidden Markov Model belonging to the scheduled-to-be-used model group,
classify a plurality of probability density functions composing each of the states of all or at least a part of the Hidden Markov Model group in the scheduled-to-be-used model group into a plurality of clusters, and
obtain given parameters for defining the probability density functions composing each of the states of the Hidden Markov Model to be used as the filler model.

14. The Hidden Markov Model generation system according to claim 11, wherein the filler model generation section classifies a plurality of probability density functions composing the Hidden Markov Model to be used as the filler model or its state into the same number of clusters as that number of the probability density functions composing the Hidden Markov Model composing the scheduled-to-be-used model group or its state.

15. The Hidden Markov Model generation system according to claim 11, wherein, when obtaining cluster values of each of the clusters, the filler model generation section performs a process to re-classify the plurality of probability density functions into the plurality of clusters to update the cluster values, a process to update parameters of probability density functions of each of the clusters, until a specified number of iterations is reached, or until changes in the parameters of probability density functions of the cluster at the time of update become lower than a specified threshold value.

16. The Hidden Markov Model generation system according to claim 11, wherein the filler model generation section
obtains a cluster value of each of the clusters based on a mean for defining one or a plurality of probability density functions classified in each of the clusters, and obtains a mean for defining probability density functions composing the Hidden Markov Model to be used as the filler model or its state based on the obtained cluster value, and
obtains a variance for defining probability density functions composing the Hidden Markov Model to be used as the filler model or its state based on a variance for defining one or a plurality of probability density functions classified into each of the clusters.

17. The Hidden Markov Model generation system according to claim 13, wherein the filler model generation section obtains a transition matrix that defines transition probabilities among states of the Hidden Markov Model to be used as the filler model, based on a transition matrix among states of all or at least a part of the Hidden Markov Model group in the scheduled-to-be-used model group.

18. The Hidden Markov Model generation system according to claim 11, comprising a model-to-be-used selection section that selects, from the scheduled-to-be-used model group, Hidden Markov Models to be used for generating filler models, as models to be used, and the filler model generation section generates Hidden Markov Models to be used as filler models by the given speech recognition system based on the Hidden Markov Model group selected as the models to be used.

19. The Hidden Markov Model generation system according to claim 18, wherein the model-to-be-used selection section detects elements necessary for speech recognition of designated vocabulary or sentence, and selects Hidden Markov Models of elements other than the detected elements as the models to be used.

20. The Hidden Markov Model generation system according to claim 18, wherein the model-to-be-used selection section detects elements necessary for speech recognition of input text data, and selects Hidden Markov Models of elements other than the detected elements as the models to be used.

21. A speech recognition system comprising:
the Hidden Markov Model generation system recited in claim 11;
a filler model storage section that stores Hidden Markov Models to be used as the filler models generated by the Hidden Markov Model generation system;
a feature extraction section that generates feature vectors of inputted speech sound data; and
a speech recognition processing section that performs speech recognition of the speech sound data based on the feature vectors, the Hidden Markov Models composing the scheduled-to-be-used mode group and the Hidden Markov Models to be used as the filler models.

22. A method for performing speech recognition with a computer, comprising:
a step of reading, from a storage section, all or a part of a group of plural Hidden Markov Models scheduled to be used by a given speech recognition system, and generating Hidden Markov Models to be used as filler models by the given speech recognition system based on all or at least a part of the group of Hidden Markov Models in the scheduled-to-be-used model group and storing them in a storage section;
a step of inputting speech sound data and generating feature vectors; and
a speech recognition step of performing speech recognition of the speech sound data based on the feature vectors, and the group of plural Hidden Markov Models scheduled to be used and the Hidden Markov Model models to be used as the filler models which are stored in the storage section;
wherein generating Hidden Markov Models to be used as filler models comprises classifying a plurality of probability density functions composing all or at least a part of the Hidden Markov Model group in the scheduled-to-be-used model group into a plurality of clusters, obtaining a given parameter for defining probability density functions composing Hidden Markov Models, based on the obtained probability density functions of each of the clusters.

* * * * *